US008560230B2

(12) United States Patent
Bell

(10) Patent No.: US 8,560,230 B2
(45) Date of Patent: Oct. 15, 2013

(54) SYSTEM AND METHOD FOR TRACKING MASS TRANSIT VEHICLES

(76) Inventor: Alex Morgan Bell, New York, NY (US)

( * ) Notice: Subject to any disclaimer, the term of this patent is extended or adjusted under 35 U.S.C. 154(b) by 554 days.

(21) Appl. No.: 12/905,502

(22) Filed: Oct. 15, 2010

(65) Prior Publication Data

US 2012/0095677 A1 Apr. 19, 2012

(51) Int. Cl.
*G01C 21/20* (2006.01)
*G01D 1/00* (2006.01)
*G08G 1/123* (2006.01)

(52) U.S. Cl.
USPC ............ 701/433; 701/527; 340/991; 340/994

(58) Field of Classification Search
USPC ........................... 701/433, 527; 340/991, 994
See application file for complete search history.

(56) References Cited

U.S. PATENT DOCUMENTS 6,374,176 B1 4/2002 Schmier et al.
6,480,785 B1 * 11/2002 Joerg et al. .................... 701/410
6,486,801 B1 11/2002 Jones
6,590,875 B1 * 7/2003 Niwa ............................ 370/328
7,394,404 B2 * 7/2008 Kim .............................. 340/994
7,469,827 B2 * 12/2008 Katragadda et al. .......... 235/384
7,957,871 B1 * 6/2011 Echeruo .......................... 701/54
8,400,294 B2 * 3/2013 Bishop et al. ............ 340/539.13
2006/0095277 A1 * 5/2006 Noonan et al. .................... 705/1
2006/0164259 A1 * 7/2006 Winkler et al. ............... 340/944
2008/0042882 A1 2/2008 Horstemeyer

* cited by examiner

*Primary Examiner* — Thomas Black
*Assistant Examiner* — Tyler Paige
(74) *Attorney, Agent, or Firm* — Moritt Hock & Hamroff LLP; Steven S. Rubin, Esq.

(57) ABSTRACT

Disclosed is a system and method for tracking mass transit vehicles, including monitoring a Base Station IDentification (BS ID) of a base station registered with a communication device; identifying a change in said BS ID; determining a current location of said communication device; determining a previous location of said communication device; calculating a distance d between said current location and said previous location; determining a subway exit closest to said current location; determining a distance dc between said current location and said subway exit; when said distance dc is less than an exit threshold, determining a subway entrance closest to said previous location; determining a distance dp between said previous location and said subway entrance; when said distance dp is less than an entrance threshold, determining a direction from said previous location to said current location; and identifying at least one subway train based on said entrance location, said exit location and said direction.

20 Claims, 5 Drawing Sheets

SYSTEM AND METHOD FOR TRACKING MASS TRANSIT VEHICLES

BACKGROUND OF THE INVENTION

1. Field of the Invention

The present invention relates to mass transportation, and more specifically to identifying arrival and departure times of mass transit vehicles.

2. Description of Related Art

Mass transportation is used by millions of people each day. In general, buses and subway trains of a mass transportation system do not adhere to specific schedules. That is, the arrival at and departure from depots of the buses and subway trains can vary greatly from day to day.

BRIEF SUMMARY OF THE INVENTION

Accordingly, the present invention has been made to solve at least the above-mentioned problems occurring in the prior art, and an object of the present invention is to provide a system and method for tracking mass transit vehicles.

To accomplish the above objects, there is provided a system and method for tracking mass transit vehicles.

In addition, there is provided a system for tracking mass transit vehicles, including a communication device configured for monitoring a Base Station IDentification (BS ID) of a base station registered with said communication device; identifying a change in said BS ID; determining a current location of said communication device; determining a previous location of said communication device; calculating a distance d between said current location and said previous location; and when the distance d is greater a location threshold, transmitting said current location, previous location, and distance; and a server configured for receiving said current location, previous location, and distance d transmitted from said communication device; determining a subway exit closest to said current location; determining a distance dc between said current location and said subway exit; when said distance dc is less than an exit threshold, determining a subway entrance closest to said previous location; determining a distance dp between said previous location and said subway entrance; when said distance dp is less than an entrance threshold, determining a direction from said previous location to said current location; and identifying at least one subway train based on said entrance location, said exit location and said direction.

Still further, there is provided a method for tracking mass transit vehicles including monitoring a Base Station IDentification (BS ID) of a base station registered with a communication device; identifying a change in said BS ID; determining a current location of said communication device; determining a previous location of said communication device; calculating a distance d between said current location and said previous location; determining a subway exit closest to said current location; determining a distance dc between said current location and said subway exit; when said distance dc is less than an exit threshold, determining a subway entrance closest to said previous location; determining a distance dp between said previous location and said subway entrance; when said distance dp is less than an entrance threshold, determining a direction from said previous location to said current location; and identifying at least one subway train based on said entrance location, said exit location and said direction.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE INVENTION

Figure 1:
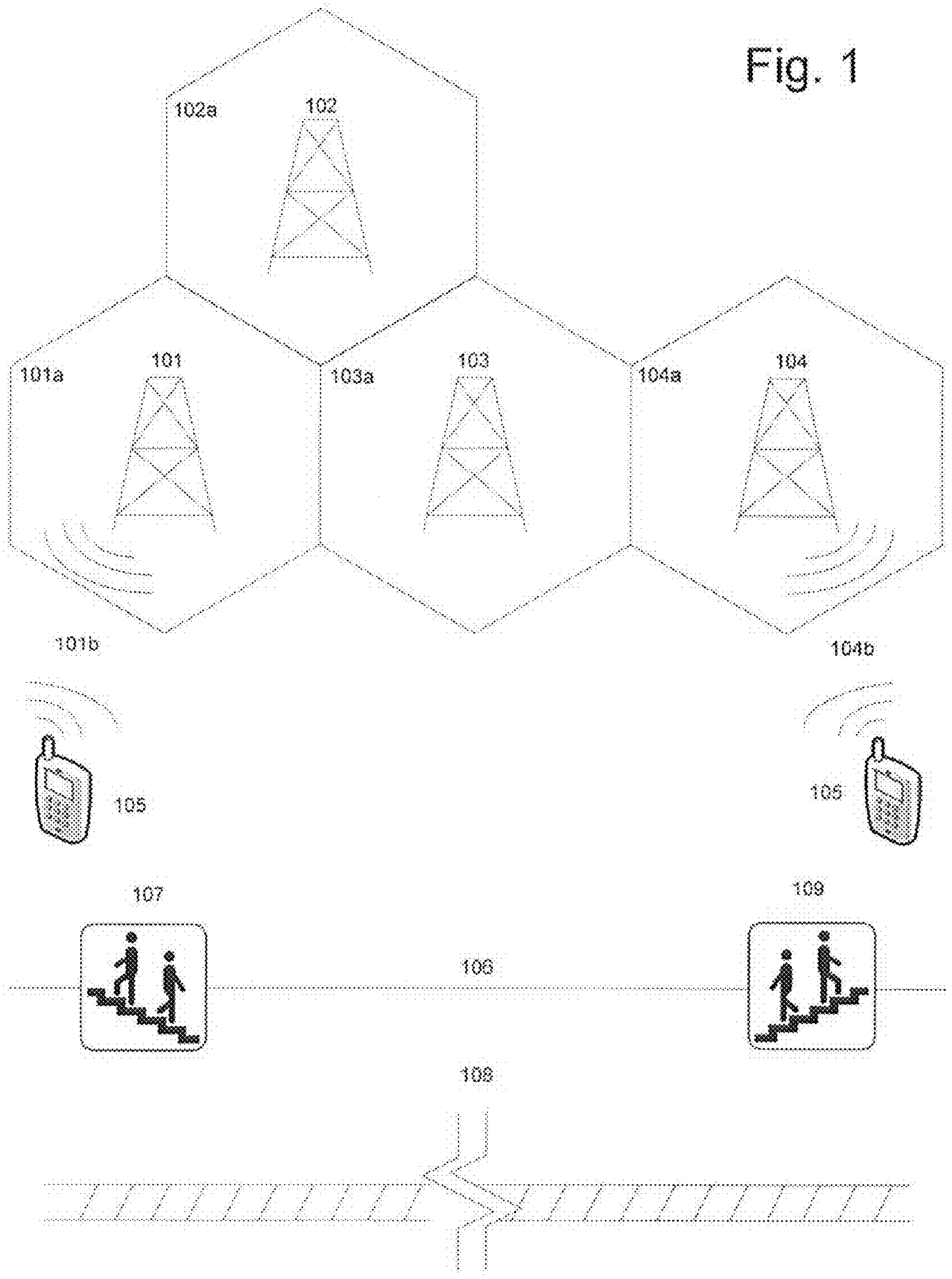
FIG. 1 is a diagram illustrating a system to which an embodiment of the present invention is applied.

Hereinafter, a preferred embodiment of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention rather unclear.

Reference will now be made to the drawings in which the various elements of the present invention will be given numerical designations. In its present form the invention consists of several distinct elements. These elements when combined as described within will allow one of ordinary skill in the art to made and use the present invention.

FIG. 1 is a diagram illustrating a system to which an embodiment of the present invention is applied. The system of FIG. 1 includes a cellular telephone system that includes base stations 101-104. The base stations 101-104 are positioned throughout a service area serviced by a telecommunications company, and each base station 101-104 provides cell service in a respective coverage area 101*a*-104*a*. The base stations 101-104 are positioned to minimize overlapping of coverage areas 101*a*-104*a* while maintaining an acceptable signal strength within each coverage area 101*a*-104*a*.

A communication device 105 performs communication through base stations 101-104. Communication device 105 can be for example a Personal Digital Assistant (PDA), a smart phone, a cellular telephone, an iPod® ("iPod"), an iTouch® ("iTouch"), etc. As communication device 105 passes through a service area of a telecommunications company, communication device 105 enters and leaves different coverage areas 101*a*-104*a*. When located within a particular coverage area 101*a*-104*a*, communication device 105 registers with and communicates through a respective base station 101-104. For example, if communication device 105 is located in coverage area 101*a*, communication device 105 would register with and communicate through base station 101.

Each base station 101-104 has a unique Base Station IDentification (BS ID) that is used to identify a base station 101-104 with which communication device 105 is in communication. As part of the registration process, a BS ID for a base station 101-104 is communicated to and stored in communication device 105. In the above example, when communication device 105 registers with base station 101, BS ID 101*b* of base station 101 is sent to and stored in communication device 105.

As communication device 105 moves between coverage areas 101*a*-104*a*, a handover process is performed. For example, as communication device moves from coverage area 101*a* into coverage area 103*a*, a handover process occurs to handover communications for communication device 105 from base station 101 to base station 103. As part of the handover process, registration with base station 103 is performed to provide communication services for communication device 105. During the registration with base station 103 BS ID 103*b* identifying base station 103 is sent to and stored in communication device 105. Also, registration with base station 101 can be ended as part of the handover process. This type of system provides seamless communications for communication device 105.

In some situations, communication device 105 leaves a base station 101-104 coverage area 101*a*-104*a* but does not complete a registration process with a new base station 101-104. This situation may occur when communication device 105 enters into a shadow area of a coverage area 101*a*-104*a*. That is, cellular communications are based on Radio Frequency (RF) signals and by their nature RF signals can be blocked from reaching all areas within a coverage area 101*a*-104*a*. These areas where the RF signals cannot reach are referred to as shadow areas. The shadow areas can be areas where buildings block the RF signals, or can be areas within buildings (e.g. basements) where the RF signals cannot reach. In a metropolitan environment, one of these shadow areas may be the subway system for a mass transit system. That is, the RF signal cannot reach into the subway platform areas and subway tunnels of the mass transit system. For example, communication device 105 may be within coverage area 101*a* of base station 101 and may leave the street level 106 and enter into subway system 108 at entrance 107. When communication device 105 enters into subway system 108, the RF signal (i.e. the communication with base station 101) may be dropped. Upon exit from subway system 108 at exit 109 communication device 105 enters into coverage area 104*a* and can be registered with base station 104. As part of the registration process communication device 105 can receive BS ID 104*b* of base station 104.

The preset invention utilizes the above-described system to provide scheduling information regarding the arrival and departure times of subway trains of a mass transit system.

Figure 2:
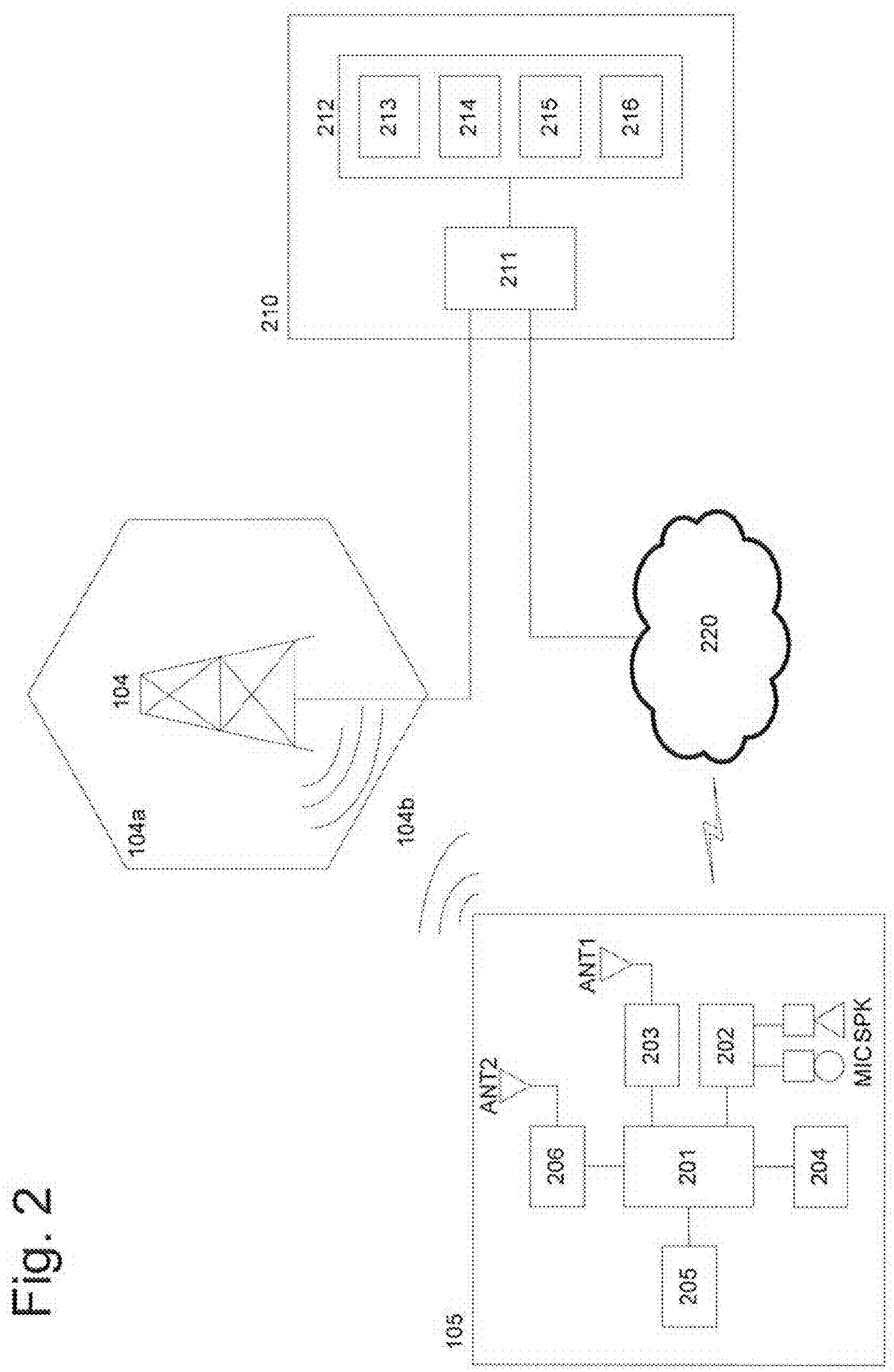
FIG. 2 is a block diagram illustrating a system according to an embodiment of the present invention.

FIG. 2 is a block diagram illustrating a system according to an embodiment of the present invention. Shown in FIG. 2 is communication device 105 that can include a processor 210 to control the overall operations of communication device 105. Communication device 105 also can include voice processor 202 under control of processor 201. Voice processor can receive voice signals from microphone MIC and can convert the voice signals to digital data. Voice processor 202 can also convert digital data into audio signals for output via speaker SPK.

Communication device 105 can also include modulator 203 that is controlled by processor 201. Modulator 203 can receive from processor 201 signals to be transmitted, modulate the signals to an RF signal, and transmit the RF signal via antenna ANT1. In addition, modulator 203 can receive RF signals via ANT1 and demodulate the RF signals for processing by processor 201. In addition to RF modulation, modulator 203 can also be equipped with other modulation devices, e.g. a WiFi modulator and/or a Bluetooth® ("Bluetooth") modulator, for transmitting and receiving signals over other wireless networks, e.g. WiFi networks and/or Bluetooth systems.

Communication device can also. include input 204 and memory 205. Input 204 can be any type of input device to receive input from a user, for example, an alpha-numeric keypad, a telephone keypad, a touch screen, etc. Memory 205 is used to store data and programs used during the operation of communication device 105.

In addition, communication device 105 can include a Global Positioning System (GPS) receiver 206 and GPS antenna ANT2. The functions provided by GPS antenna ANT2 can be provided by antenna ANT1 if so equipped, thus negating the need for two antennas. GPS is used to determine a position of GPS receiver 206 utilizing signals received from orbiting GPS satellites. That is, by using the signals received from the GPS satellites, a device equipped with GPS receiver 206 can determine its position, i.e. longitude and latitude. GPS is well known in the art. Other systems and methods of determining the location of communication device 105 are contemplated and can include systems and methods for triangulating a position based on signals received from a plurality of stationary terrestrial based transmitters, which can include base stations. Triangulation systems and methods are well known in the art. Many communications devices available on the market come equipped with GPS and/or triangulation systems.

Also shown in FIG. 2 are base station 104 and network 220. In an embodiment of the present invention, base station 104 can function to provide its BS ID 104*b* to communication device 105. Network 220 can include the Internet or other local or wide area networks, e.g. WiFi and/or Bluetooth.

Also shown in FIG. 2 is server 210, which includes processor 211 and a memory 212. Processor 211 controls the overall operation of server 210. Memory 212 can include data and programs to operate server 210. Memory 212 can also include databases of information used by the system and method for tracking mass transit vehicles according to an embodiment of the present invention. For example, memory 212 can include subway train route information database 213 for storing subway train route information, subway system entrance/exit location database 214 for storing the location of subway system entrance/exit locations, base station location database 215 for storing base station location and BS ID information, and communication device database 216 for storing information and data received from communication devices.

Communications between communication device 105 and server 210 can be conducted using the cellular communication system through base station 104 and/or using network 220, and although server 210 is shown connected to both base station 104 and network 220 only one of the connections is required. Other communication devices (not shown) can also connect to server 210 to communicate data and information therewith.

One function of server 210 is to generate and make available to a user information regarding the tracking of mass transit vehicles. That is, by utilizing information received from at least one communication device, server 210 can determine a location of a subway train and calculate times at which the subway train has and will arrive at subway stations. This information of the location and arrival times of the subway trains can be made available users connecting to server 210. Users can connect to server 210 using wireless communication devices, laptops, personal desktop computers, etc.

Figure 3:
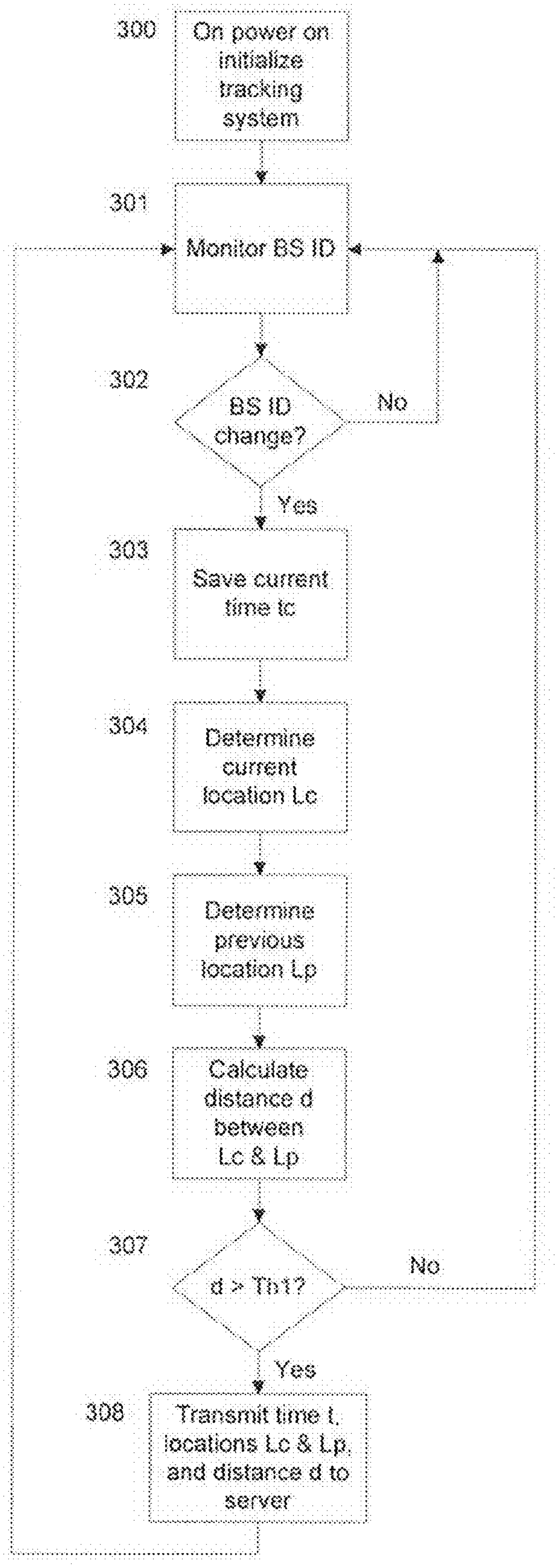
FIG. 3 is a flow chart illustrating a method according to an embodiment of the present invention.

FIG. 3 is a flow chart illustrating a method according to an embodiment of the present invention. In step 300, when initial power is supplied to communication device 105, processor 201 initializes the tracking system. In step 301, communication device 105 monitors the BS ID of the base station currently communicating with communication device 105. In step 302, communication device 105 determines if there is a change in the BS ID. If there is no change in the BS ID, communication device continues to monitor the BS ID. If there is a change in the BD ID, in step 303, communication device 105 saves the current time tc in memory 205.

In step 304, communication device 105 determines its current location Lc. As described above, the current location Lc of communication device 105 can be determined using GPS or a terrestrial based triangulation system. Whichever system is used, communication device 105 determines its location every time a change in BS ID is detected.

In step 305, communication device 105 determines its previous location Lp. The previous location Lp is determined using the BS ID just prior to the detected change in the BS ID in step 302. Communication device 105 stores in its memory 205 base station information that includes the BS ID and location of base stations. Then, using the prior BS ID, communication device 105 reads from memory the location of the base station corresponding to the prior BS ID. The location of the base station corresponding to the prior BS ID is used as the previous location Lp.

In step 306, communication device 105 calculates a distance d between the current location Lc and the previous location Lp. In step 307, communication device 105 determines if distance d is greater than a threshold Th1. Threshold Th1 is utilized to determine if communication device 105 traveled on a subway train within the subway system. For example, if the minimum distance between any two subway stations is ½ mile, then threshold Th1 can be set to ½ mile. Then, when communication device 105 determines that the BS ID has changed and it has traveled more than ½ mile, it is probable that communication device 105 was traveling on a subway train. If distance d is less than threshold Th1, it is more probable that communication device 105 was in a shadow area other than the subway system (e.g. in a building). If distance d is not greater that threshold Th1, the process returns to step 301 to continue monitoring the BS ID. If distance d is greater that threshold Th1, communication device 105 transmits time t, locations Lc and Lp, and distance d to server, and returns to step 301 to continue monitoring the BS ID. As stated, the transmission of time t, locations Lc and Lp, and distance d to server can be through a cellular telecommunications system or other network.

Figure 4A:
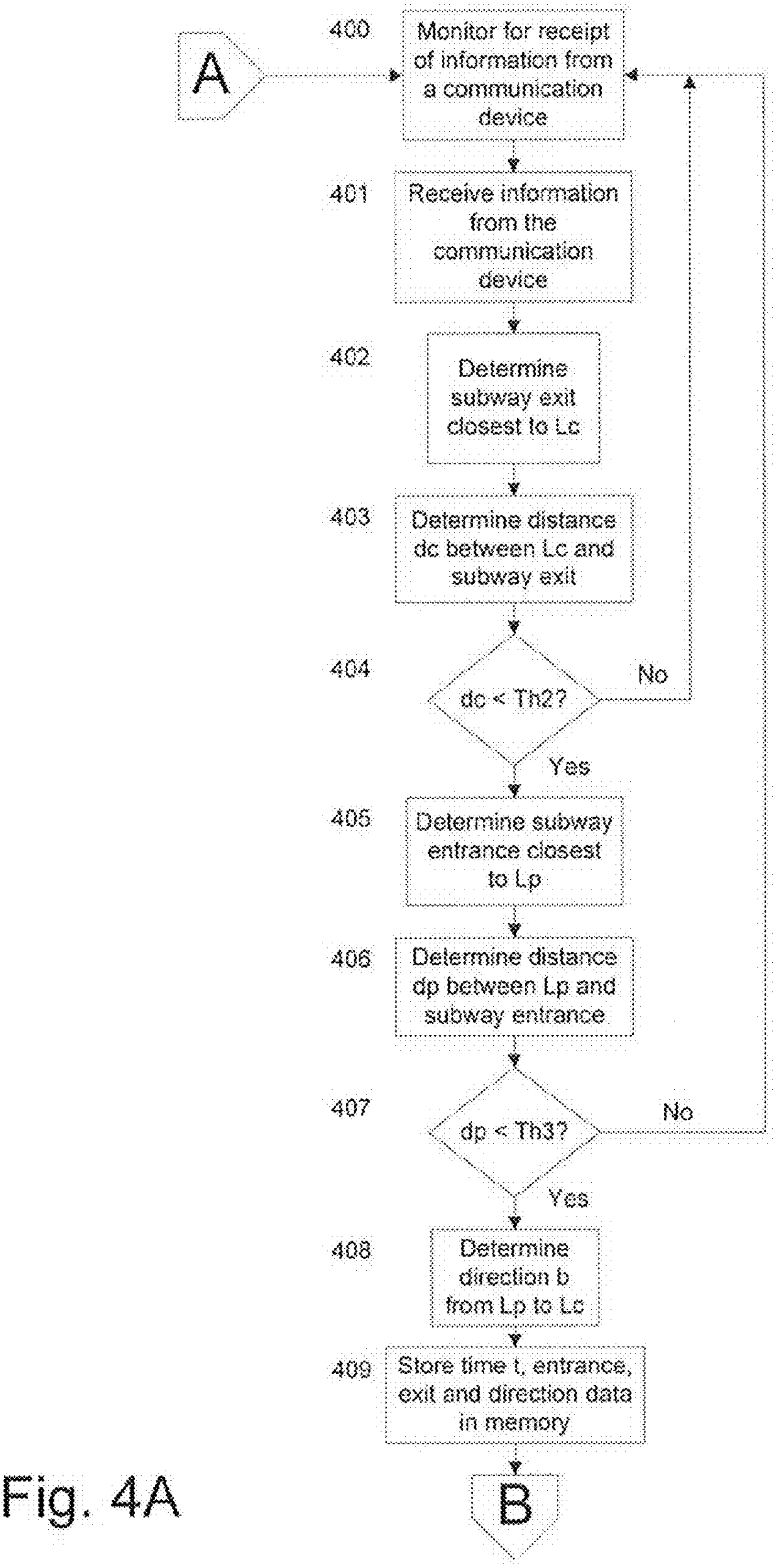
FIGS. 4A and 4B are a flow diagram illustrating a method according to an embodiment of the present invention.
Figure 4B:
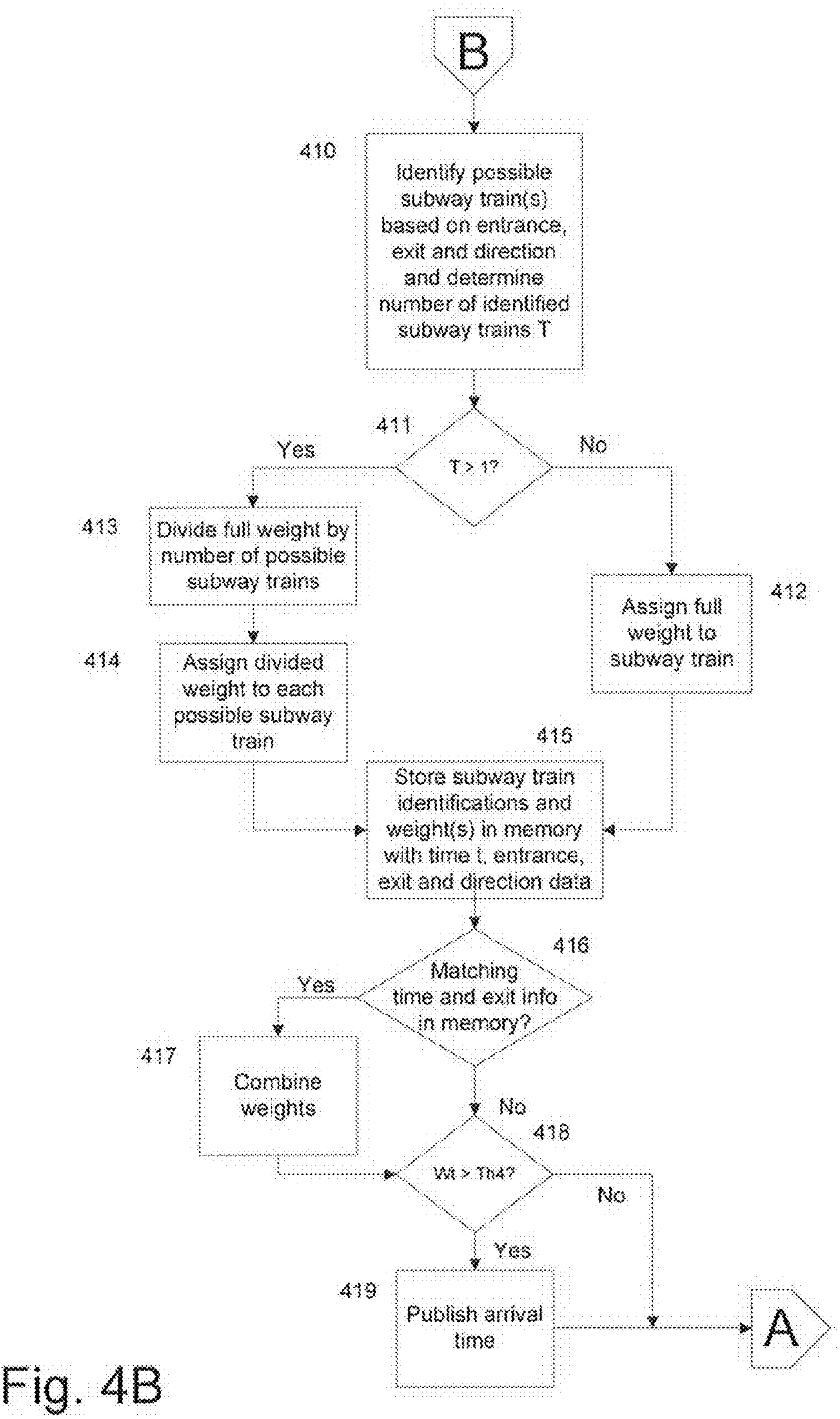

FIGS. 4A and 4B are a flow diagram illustrating a method according to an embodiment of the present invention. In step 400, server 210 monitors for receipt of information from a communication device. Although the present invention will operate based on information from one communication device, it is note that as the number of communication devices transmitting information to the server increases the accuracy of the tracking will also increase.

In step 401, server 211 receives information from the communication device. In step 402, server 210 determines a subway exit closest to current location Lc. As stated above, server 210 stores in memory 212 subway train route information, locations of subway system entrances/exits, base station location and BS ID information, and information and data received from communication devices. By cross-referencing the locations of subway system entrances/exits with current location Lc, server 210 can determine the closest subway exit to current location Lc.

In step 403, server 210 determines a distance dc between current location Lc and the closest subway exit. In step 404, server 210 determines if distance dc is less than threshold Th2. Threshold Th2 is utilized to determine if communication device 105 is located close to a subway exit to make a determination that communication device 105 emerged from the subway system and registered with a current base station (i.e. BS ID has changed). Ideally, threshold Th2 should be set to a value of a few feet, but greater distances can be used while maintaining system integrity. If distance dc is not less than threshold Th2, server 210 disregards the data and returns to step 400.

It is noted here that in another embodiment of the present invention steps 402-404 can be performed at communication device 105. In order for communication device 105 to perform step 402 the locations of the subway system entrances/exits must be available to communication device 105. That is, communication device 105 can store the, locations of the subway system entrances/exits in memory 205. In addition, when steps 402-404 are performed in communication device 105, if in step 404 it is determined that distance dc is not less than threshold Th2, the process would return to step 301 to monitor the BS IDs.

Returning again to FIG. 4A, if distance dc is less than threshold Th2, in step 405, server 210 determines a subway entrance closest to previous location Lp. As stated above, server 210 stores in memory 212 the locations of the subway system entrances/exits. By cross-referencing the locations of subway system entrances/exits with previous location Lp, server 210 can determine the closest subway entrance to previous location Lp. In step 406 server 210 determines a distance dp between previous location Lp and the determined subway entrance. In step 407, server 210 determines if distance dp is less than threshold Th3. Threshold Th3 is utilized to determine if communication device 105 was previously located close to a subway entrance to make a determination that communication device 105 entered into the subway system at previous location Lp. Ideally, threshold Th3 should be set to a value of a few feet, but greater distances can be used while maintaining system integrity, and greater distances can be required for Th3 since Lp was determined based on the location of a base station (using previous BS ID) and not communication device 105 itself. If distance dp is not less than threshold Th3, server 210 disregards the data and returns to step 400.

If distance dp is less than threshold Th3, in step 408, server 210 determines a direction (or bearing) b from previous location Lp to current location Lc. In step 409, server 210 stores time t, entrance location, exit location and direction b in memory 212. This information can be stored in communication device database 216.

In step 410 of FIG. 4B, server 210 identifies at least one possible subway train that communication device 105 may have exited from based on the entrance location, exit location and direction b and determines a total number of identified subway trains T. That is, server 210 stores in memory 212 subway train route information. By cross-referencing the subway train route information with the entrance location, exit location and direction b, server 210 can determine at least one subway train having a route matching this information. In some subway systems, more than one subway train share at least a portion of the same subway route, thus making it possible that more than one subway train is identified as running in direction b, through an entrance location and an exit location. In step 411, server 210 determines if the number of possible subway trains T determined in step 410 is greater than 1. If it is determined that the number of subway train T is not greater than 1, then in step 412, server 210 assigns a full weight to subway train T. On the other hand, if it is determined that the number of subway train T is greater than 1, then in step 413, server 210 divides a full weight by the number of possible subway trains T. In step 414, server 210 assigns a divided weight to each possible subway train.

In providing the system and method for tracking mass transit vehicles according to the present invention, the abovementioned weight is utilized to provide more accuracy to the system and method. The weight can prevent false positive subway train identifications from skewing a final arrival time result that is made available to a user. This is accomplished by only publishing subway train identifications that exceed a total weight as will now be described.

In step 415, server 210 stores subway train identifications and weight(s) in memory 212 with time t, entrance, exit and direction data. In step 416, server 210 determines if information received from another communication device having a same subway exit and approximately a same time exist in memory. If information received from another communication device having a same subway exit and approximately a same time does exist in memory 212, in step 417, server 210 combines the weights of matching identified subway trains to obtain a combined identified subway train weight Wt for each identified subway train. Then, in step 418, server 210 determines if each combined identified subway train weight Wt is greater than threshold Th4. As stated above, the weight Wt is used to prevent false positive identifications from being published. Thus, for example, threshold Th4 can be set to a low number for typically quiet subway stations, but set for a higher number for busy subway stations. If the combined identified subway train weight Wt for a given subway train is greater than threshold Th4, in step 419, server 210 publishes the identified subway train and its arrival time for viewing by users. If the combined identified subway train weight Wt for a given subway train is not greater than threshold Th4, or after server 210 publishes the identified subway train and its arrival time for viewing by users, the process returns to step 400.

Once the subway train and arrival time information is published, users can access the published information to view the information. The information can be made available via any number of methods, including but not limited to, an Internet website, email, text messaging, pushed to a communication device, etc. However obtained, the information provides users with up-to-date information regarding the arrival times of subway trains at particular subway stations such that users can more accurately schedule their mass transit transportation needs.

Although a cellular telephone as a communication device is used as an example herein, any device equipped with a GPS receiver or other location determining device that is also capable if monitoring BS IDs and performing data communication with a remote server can be adapted to perform as described herein.

In addition, although the preferred embodiment is described herein as using BS IDs to determine that a significant change in location has occurred (i.e. moving from a subway entrance to a subway exit), other methods of arriving at this determination are contemplated. For example, instead of relying on the BS IDs, another embodiment can rely on Wi-Fi hot spot location registrations, by continuously monitoring GPS locations, or other similar methods.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A system for tracking mass transit vehicles, comprising:

a communication device configured for monitoring a Base Station IDentification (BS ID) of a base station registered with said communication device;

identifying a change in said BS ID;

determining a current location of said communication device;

determining a previous location of said communication device;

calculating a distance d between said current location and said previous location; and when the distance d is greater a location threshold, transmitting said current location, previous location, and distance; and a server configured for receiving said current location, previous location, and distance d transmitted from said communication device;

determining a subway exit closest to said current location;

determining a distance dc between said current location and said subway exit;

when said distance dc is less than an exit threshold, determining a subway entrance closest to said previous location;

determining a distance dp between said previous location and said subway entrance;

when said distance dp is less than an entrance threshold, determining a direction from said previous location to said current location; and identifying at least one subway train based on said entrance location, said exit location and said direction.

2. The system of claim 1, wherein said communication device is further configured for saving a time at which said change in the BS ID is identified and transmitting said time to said server, and wherein said server is further configured for outputting said at least one subway train and said time as an arrival time of said at least one subway train.

3. The system of claim 1, wherein said current location is determined using at least one of a Global Positioning System (GPS) and a terrestrial based triangulation system.

4. The system of claim 1, wherein said previous location is determined using a BS ID of a base station registered with said communication device prior to said change in said BS ID.

5. The system of claim 4, wherein said previous location is a location of said base station registered with said communication device prior to said change in said BS ID.

6. The system of claim 1, wherein if a total number of identified subway trains is not greater than 1, said server assigns a full weight to said subway train, and wherein if said total number of identified subway trains is greater than 1, said server divides a full weight by the number of identified subway trains and assigns a divided weight to each identified subway train.

7. The system of claim 6, wherein said communication device is further configured for saving a time at which said change in the BS ID is identified and transmitting said time to said server, and wherein, if said weight assigned to a subway train is greater than a weight threshold, said server is further configured for outputting said subway train having a weight greater than said weight threshold and said time as an arrival time of said subway train having a weight greater than said weight threshold.

8. The system of claim 1, further comprising:

a plurality of communication devices each configured for transmitting respective current locations, previous locations, and distances d; and transmitting a respective time at which a change in said BS ID is identified; and said server further configured for receiving said respective current locations, previous locations, distances d, and times;

determining respective directions between respective said previous locations and said current locations; and identifying at least one subway train based on at least some of said respective entrance locations, said exit locations and said directions.

9. The system of claim 8 wherein said server is further configured for assigning a weight to each identified subway train and, if at least one subway train matching a same subway exit and approximately a same time exist in a memory, combining said weights of said identified subway trains with a weight of said at least one matching subway train to obtain a combined identified subway train weight for each subway train.

10. The system of claim 9, wherein said server is further configured for, if each combined identified subway train weight is greater than a combined weight threshold, outputting each of said identified subway trains and a respective time as an arrival time of said respective subway train.

11. A method for tracking mass transit vehicles, comprising:

monitoring a Base Station IDentification (BS ID) of a base station registered with a communication device;

identifying a change in said BS ID;

determining a current location of said communication device;

determining a previous location of said communication device;

calculating a distance d between said current location and said previous location;

determining a subway exit closest to said current location;

determining a distance dc between said current location and said subway exit;

when said distance dc is less than an exit threshold, determining a subway entrance closest to said previous location;

determining a distance dp between said previous location and said subway entrance;

when said distance dp is less than an entrance threshold, determining a direction from said previous location to said current location; and identifying at least one subway train based on said entrance location, said exit location and said direction.

12. The method of claim 11, further comprising:

saving a time at which said change in said BS ID is identified; and outputting said at least one subway train and said time as an arrival time of said at least one subway train.

13. The method of claim 11, wherein said current location is determined using at least one of a Global Positioning System (GPS) and a terrestrial based triangulation system.

14. The method of claim 11, wherein said previous location is determined using a BS ID of a base station registered with said communication device prior to said change in said BS ID.

15. The method of claim 14, wherein said previous location is a location of said base station registered with said communication device prior to said change in said BS ID.

16. The method of claim 1, further comprising:

if a total number of identified subway trains is not greater than 1, assigning a full weight to said subway train; and if said total number of identified subway trains is greater than 1, dividing a full weight by the number of identified subway trains and assigning a divided weight to each identified subway train.

17. The method of claim 16, further comprising:

saving a time at which said change in the BS ID is identified and transmitting said time to said server; and if said weight assigned to a subway train is greater than a weight threshold, outputting said subway train having a weight greater than said weight threshold and said time as an arrival time of said subway train having a weight greater than said weight threshold.

18. The method of claim 11, further comprising:

receiving respective current locations, previous locations, distances d, and times from a plurality of communication devices;

determining respective directions between respective said previous locations and said current locations; and identifying at least one subway train based on at least some of said respective entrance locations, said exit locations and said directions.

19. The method of claim 18, further comprising, assigning a weight to each identified subway train and, if at least one subway train matching a same subway exit and approximately a same time exist in a memory, combining said weights of said identified subway trains with a weight of said at least one matching subway train to obtain a combined identified subway train weight for each subway train.

20. The method of claim 19, further comprising, if each combined identified subway train weight is greater than a combined weight threshold, outputting each of said identified subway trains and a respective time as an arrival time of said respective subway train.

* * * * *